US005438697A

United States Patent [19]

Fowler et al.

[11] Patent Number: 5,438,697

[45] Date of Patent: Aug. 1, 1995

[54] MICROSTRIP CIRCUIT ASSEMBLY AND COMPONENTS THEREFOR

[75] Inventors: Wayne D. Fowler, Burlington; Ronald E. Guimond, Amesbury, both of Mass.; Thomas G. Andrikowich, Weare; A. David Kozlovski, Atkinson, both of N.H.; Neil E. Foster, Billercia; Scott A. DesRoche, Newbury, both of Mass.

[73] Assignee: M/A-Com, Inc., Lowell, Mass.

[21] Appl. No.: 872,447

[22] Filed: Apr. 23, 1992

[51] Int. Cl.$^{6}$ .................. H04B 1/08

[52] U.S. Cl. .................. 455/347; 455/280; 333/204; 333/247; 343/700 MS

[58] Field of Search .................. 455/347, 349, 351, 280, 455/288, 3.2, 281, 300, 301; 343/700 MS, 701, 873; 333/204, 246, 247

[56] References Cited

U.S. PATENT DOCUMENTS

| | | | |
|---|---|---|---|
| 3,558,423 | 1/1971 | Rossetti . | |
| 4,051,476 | 9/1977 | Archer et al. . | |
| 4,051,478 | 9/1977 | Kaloi . | |
| 4,067,016 | 1/1978 | Kaloi . | |
| 4,197,544 | 4/1980 | Kaloi . | |
| 4,692,769 | 9/1987 | Gegan . | |
| 4,728,962 | 3/1988 | Kitsuda et al. . | |
| 4,766,440 | 8/1988 | Gegan . | |
| 4,816,835 | 3/1989 | Abiko et al. . | |
| 4,827,271 | 5/1989 | Berneking et al. . | |
| 4,857,938 | 8/1989 | Tsukamoto et al. . | |
| 4,878,062 | 10/1989 | Craven et al. . | |
| 4,894,663 | 1/1990 | Urbish et al. . | |
| 4,914,448 | 4/1990 | Otsuka et al. | 343/700 MS |
| 4,914,449 | 4/1990 | Fukuzawa et al. . | |
| 4,924,237 | 5/1990 | Honda et al. . | |
| 4,975,711 | 12/1990 | Lee . | |
| 4,987,425 | 1/1991 | Zahn et al. . | |
| 5,001,492 | 3/1991 | Shapiro . | |
| 5,001,778 | 3/1991 | Ushiyama et al. . | |
| 5,043,738 | 8/1991 | Shapiro . | |
| 5,048,118 | 9/1991 | Brooks et al. . | |
| 5,107,404 | 4/1992 | Tam et al. . | |
| 5,142,698 | 8/1992 | Koga et al. | 343/700 MS |
| 5,198,824 | 3/1993 | Poradish | 343/700 MS |

FOREIGN PATENT DOCUMENTS

| | | | |
|---|---|---|---|
| 2814505 | of 1978 | Germany . | |
| 0262703 | 10/1990 | Japan | 343/700 MS |

OTHER PUBLICATIONS

IEEE, Jan. 1981 Publication of the IEEE Antennas and Propagation.

*Primary Examiner*—Reinhard J. Eisenzopf
*Assistant Examiner*—Nguyen Vo
*Attorney, Agent, or Firm*—St. Onge Steward Johnston & Reens

[57] ABSTRACT

A microwave antenna and receiver assembly is described for use at gigaherz frequencies wherein the antenna is a microstrip antenna and the receiver includes a stripline filter circuit which is integrated in a layered configuration with both the microstrip antenna and the amplifier so as to achieve a very low noise figure, a low SWR and preserve good receiver characteristics, while being easily assembled inside a common radome housing. An inexpensive substrate material formed of alternating layers of polypropylene and woven glass is described for use with the microstrip antenna and other microwave structures.

16 Claims, 6 Drawing Sheets

MICROSTRIP CIRCUIT ASSEMBLY AND COMPONENTS THEREFOR

FIELD OF THE INVENTION

This application generally relates to a microstrip circuit and more particularly to a microstrip antenna and receiver for use at gigaherz frequencies, such as are used in a global positioning system.

BACKGROUND OF THE INVENTION

Microstrip antennas are well known in the art. Typically, such an antenna employs an antenna patch which is a shaped conductive cladding on one side of a substrate having a similar cladding on the other side for a groundplane. A good starting point for a description of microstrip antennas can be found in a publication of the IEEE Antennas and Propagation Society of Jan. 1981, Volume AP-21.

In a microstrip antenna, the radiating element is often referred to as the patch. The shape of the patch and its feedpoint determine such characteristics as polarization, SWR (standing wave ratio) and the radiation pattern.

The substrate material, plays an important role in the performance of a microstrip antenna because of its dielectric constant. When temperature changes affect the dielectric constant, the center resonant frequency of the patch tends to shift. If the passband for a receiving patch is, for example, about 2% for a 1.575 gigaherz center frequency, then a change of the dielectric constant as a result of temperature changes or production manufacturing techniques can shift the passband too much. This could result in an excessive undesirable deterioration in the performance of the patch antenna.

Various materials and techniques are used to improve the dimensional stability of the microstrip antenna. PTFE, polytetrafluorethylene, tends to be the material of choice, particularly when it is combined with a glass fiber in a woven web to improve stability or with a glass randomly oriented fiber.

PTFE has excellent characteristics at the frequencies of interest, but tends to be expensive. Use of random fibers tends to result in unpredictable voids and an uneven dielectric constant in the substrate and thus an uneven performance from one patch antenna to the next.

The design of a patch antenna must take the feed line into consideration because of the way it influences excitation of the edges and the impedance represented to the input or output circuit. When the patch antenna is employed as a receiver, it is particularly important that a proper impedance match is obtained at the feed point which should be at a location which is compatible with the layout of underlying receiver circuitry.

Various feed lines have been described, including feed lines which extend to particularly desired excitation regions inside a patch by way of undercuts made in the patch alongside a feed line. U.S. Pat. No.. 4,692,769 shows one form of such undercut with a feedline for a rectangular patch. FIG. 5 in U.S. Pat. No.. 4,067,016 shows a pair of undercut feed lines applied to the corners of a square-shaped patch.

Other feeds for patch antennas are shown in U.S. Pat. Nos. 4,197,544 and 4,051,478.

When a patch antenna is employed for receiving signals from so-called GPS global position system satellites, the signal strength at the ground tends to vary with very weak levels occurring from time to time. Proper reception requires a low noise figure to provide reliable operation in a wide range of field conditions. Low noise figures are difficult to achieve, particularly when a broad range of ground conditions must be considered, such as wide temperature swings, exposure to sunlight, rain, etc.

SUMMARY OF THE INVENTION

With a microstrip circuit in accordance with the invention, a low noise figure performance is achieved with an economical structure that is convenient to assemble and capable of withstanding a broad range of adverse environmental conditions.

This is achieved with one microstrip circuit in accordance with the invention by employing a radome housing in which a microstrip patch antenna is placed adjacent the top of the radome, and a receiver section formed of a filter and amplifier assembly is placed adjacent the groundplane of the patch antenna.

The microstrip antenna has an output connector that is embedded within the antenna and can be pushed onto a complementary fitting connector in the filter and amplifier assembly. The entire microstrip circuit quickly and conveniently snap fits into the radome in a manner whereby the electromagnetic impact of the radome on the performance of the patch antenna remains consistent. This is achieved by forming the radome of a plastic material with some resilience in the top portion. This enables the antenna assembly to be pressure loaded against the top portion of the radome which then abuts the antenna patch as the assembly snap fits into the radome.

Particular advantages of the entire microstrip circuit are its low noise figure at the frequency band of interest and a low SWR. These are achieved by employing a combination of features such as an antenna patch wherein the feed line is shaped and oriented in a particular way so as to reduce sensitivity to the position of the connector. This in turn facilitates the design of underlying receiver circuitry such as a filter and rf amplifier. In addition, the antenna patch is provided with a central slot that is selectively oriented to achieve a desired phase separation for circular polarization.

Another feature of the microstrip circuit of this invention is the use of a receiver circuit formed of a filter and amplifier structure that is conveniently assembled with the microstrip antenna inside the radome to form a layered assembly. The receiver includes a strip line-type triplate circuit in which outer conductor plates mate together to form a transmission line between then. A thin substrate carrier board is suspended between the plates and carries conductive claddings shaped to form spaced apart input and output filters. An rf amplifier is placed between the input and output filters in such manner as to maintain a low noise figure with a low SWR over the bandwidth of interest.

A microstrip circuit in accordance with the invention is particularly useful to receive signals from GPS satellites. These signals tend to vary from time to time as well as place to place so that a high performing receiving circuit is needed. High performance, however, frequently also is attended by high costs. Hence, another feature of the microstrip circuit of this invention is an economic construction and assembly. In the microstrip patch antenna, the substrate, instead of using expensive PTFE material, employs a substrate formed of alternating layers of polypropylene and woven glass. The polypropylene layers are preferably substantially thicker than the layers of woven glass. This substrate material has desired electromagnetic performance characteristics such as a uniform and stable dielectric constant in the frequency range of interest and over the temperature range expected for its uses. The substrate can be used for other microwave structures.

It is, therefore, an object of the invention to provide a microstrip antenna and receiver circuit suitable for use at gigaherz frequencies and having a low noise figures, low SWR and is convenient to assemble.

It is a further object of the invention to provide a circular polarized microstrip antenna. It is another object of the invention to provide a substrate material which is relatively inexpensive and has excellent characteristics at microwave frequencies such as a low loss material and a stable dielectric constant.

It is a further object of the invention to provide a microwave filter and amplifier assembly having a very low noise figure and low SWR.

These and other advantages and objects of the invention can be understood from the following detailed description of a preferred embodiment as illustrated in the drawings.

DETAILED DESCRIPTION OF DRAWING

Figure 1:
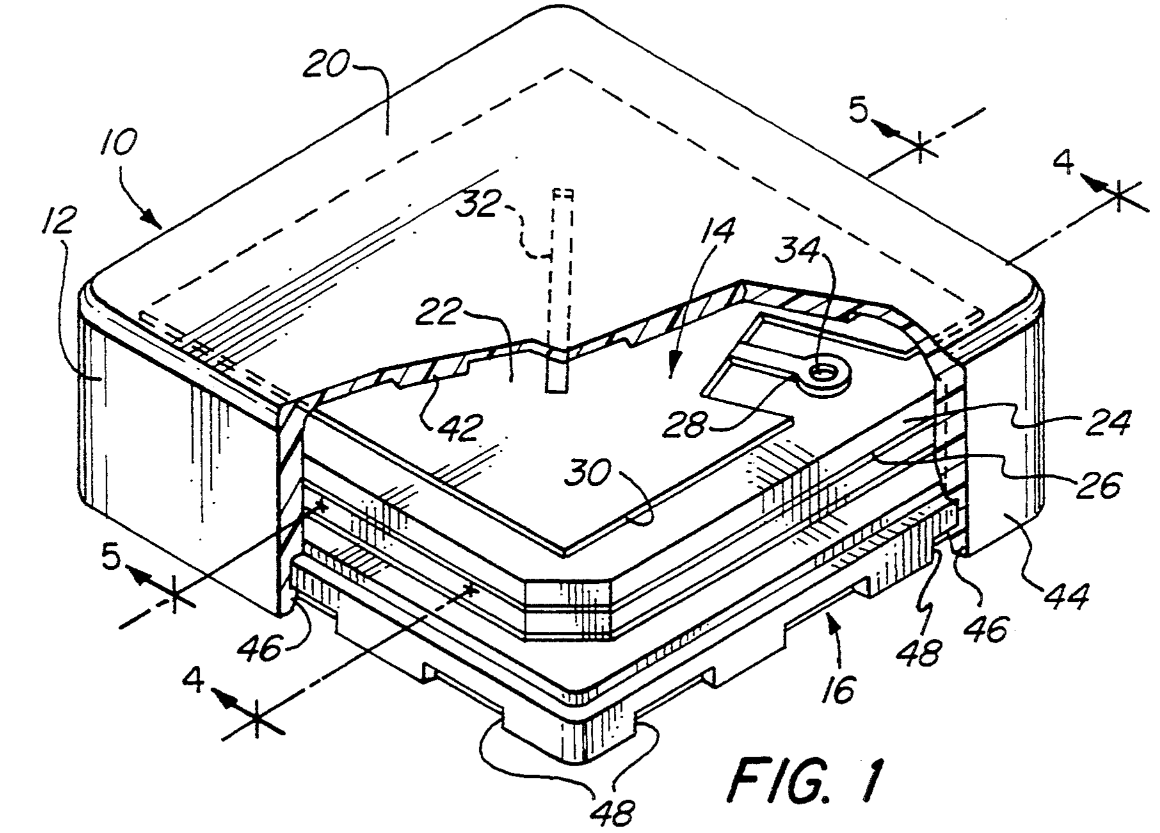
FIG. 1 is a perspective, partially broken away view of a microstrip circuit in accordance with the invention.
Figure 2:
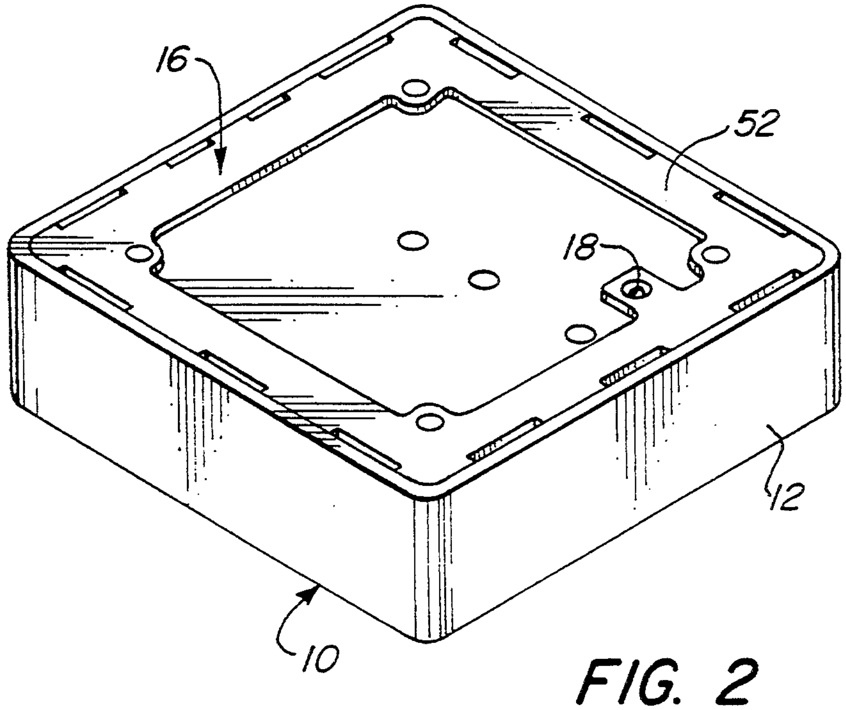
FIG. 2 is a perspective underside view of the assembled microstrip circuit of FIG. 1.

With reference to FIGS. 1 and 2, a multilayered microstrip circuit 10 is shown formed of a plastic radome housing 12 which encloses a microstrip patch antenna 14 on top of a receiver assembly 16. The microstrip circuit 10 is specifically adapted for use as a receiver of GPS signals at 1.575 gigaherz, though the principles of the invention can be applied to different signals as well as different microwave frequencies. The input is the patch antenna 14 and an output is made available at a female type (basket) connector 18 that is embedded within the receiver assembly 16.

The microstrip patch antenna 14 and filter amplifier assembly 16 snap fit into the radome housing 12, whose top portion 20 abuts an antenna patch 22. The antenna patch 22 is shaped to provide circular polarization with an omnidirectional antenna pattern capable of receiving GPS signals from GPS satellites having diverse positions.

Antennas, as is well know, can be used in transmitting as well as receiving modes so that antenna terms such as "radiating element" and "feed" line, etc., apply to both modes. In the patch antenna 14 a top radiating antenna patch 22 is formed on a substrate 24 which has an antenna groundplane 26 on the underside.

The antenna patch 22 is of the rectangular, preferably generally square, type with an angled feed line 28 extending inwardly from an edge 30 towards a non-radiating slot 32. A connector 34 extends downward from feedline 28 for contact with a mating connector 36 in the filter amplifier 16 (see FIG. 4).

The microstrip patch antenna 14 and receiver assembly 16 assemble in layered fashion within the radome housing recess 40. The top portion 42 of the radome 12 is in contact with the antenna patch 22, which in turn is pressure loaded against top portion 42 by way of a snap fit of receiver assembly 16 with depending wall 44. The snap fit is achieved between spaced-apart tongs 46 at the bottom of wall 44 and cut-outs 48 at the bottom edge of receiver assembly 16.

Figure 3:
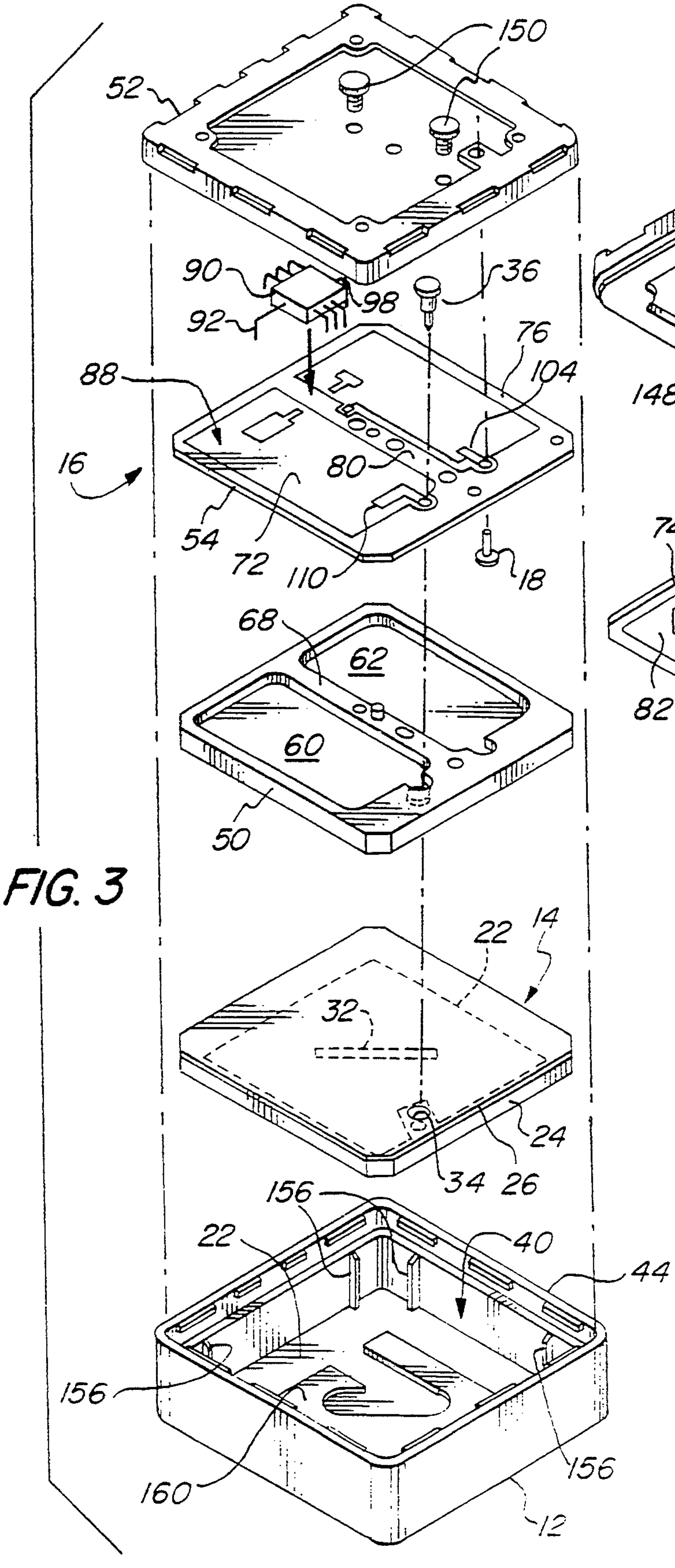
FIG. 3 is an underside perspective exploded view of the microstrip, circuit of FIG. 1.
Figure 3A:
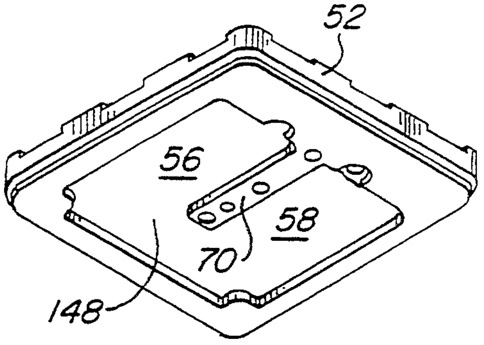
FIG. 3A is a perspective view of the top side of a bottom plate used in the microstrip circuit.
Figure 3B:
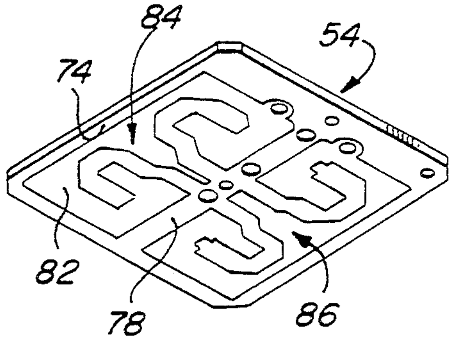
FIG. 3B is a perspective view of the top side of a filter board used in the microstrip circuit of FIG. 3.

With reference to FIGS. 3, 3A, and 3B, further details of the microstrip circuit 10 are shown. The receiver assembly 16 is formed of a pair of mating upper and lower metal plates 50, 52 respectively, which together and with a thin circuit carrier board 54 form a folded stripline triplate network. The plates 50, 52 each have like-shaped recesses 56, 58, 60, 62 which, when the plates 50, 52 are stacked together, form microwave lines 64, 66, (see FIG. 5) separated by isolation walls 68, 70.

The circuit carrier board 54 has conductive copper claddings on both sides of a substrate 72 with the claddings shaped by conventional etching processes. The claddings include perimeter conductors 74, 76 which are shaped commensurate with the shape of the perimeter walls around recesses 56-62 and include center conductors 78, 80. The conductors 74, 76, 78, 80 are grounded by clamping contact with isolation walls 68, 70, as well as the other perimeter walls around recesses 56–62.

With additional reference to FIGS. 6–8 and 8A, circuit board 54 further carries on one upper side 82, claddings in the form of input and output filters 84, 86 respectively and on the other side 88 an rf amplifier 90. The amplifier 90 fits over a center conductor 80 on the underside 88 of carrier board 54. A short input lead 92 is connected to a conductive land 94 that overlaps an output portion of the input filter 84 so as to form a capacitor 95 for coupling signals from the input filter 84.

Similarly, an output lead 98 of amplifier 90 is connected to a conductive land 100 that overlaps an input portion of the output filter 86 to form a capacitor 101 to couple amplified output signals to filter 86. DC power input for amplifier 90 is provided through a thin lead 102, which is highly inductive at the center frequency, and is located parallel to and slightly spaced from grounded conductor 80. Lead 102 connects to a conductor land 104 which overlaps an output portion of the output filter 86 to form a capacitor 105 for coupling amplified and filtered signals to an output connector 18 as more particularly shown in FIG. 4. Capacitor plate 104 in addition to forming a capacitive coupling between output filter 86 and connector 18 permits DC power to be delivered to amplifier 90 via lead 102. Other leads of amplifier 90 are shown connected to grounded conductor 80.

A similar capacitive coupling is obtained at the input of input filter 84 from connector 36 (see FIG. 4), which connects to a conductive land 110 which overlaps a portion of the input filter 84 to form a capacitor 112.

The rf amplifier 90 can be made of various designs provided these meet desired performance objectives. In the instant embodiment, which is intended for a GPS frequency of 1.575 gigaherz, the desired gain at that frequency is about 27 db, with a VSWR of 1.2 to 1, a noise figure of about 0.8 db and with a third order intercept of about 20 dBm and capable of handling 10 dBm of input power.

One rf amplifier meeting these characteristics was made using two stages of gallium arsenide FETs and a series feedback noise matching network to help achieve the low noise figure. The two stages employ a series biasing configuration for low current loading. One technique for making such rf amplifier is described in U.S. Pat. No.. 4,737,236, which is incorporated herein by reference thereto.

Figure 8:
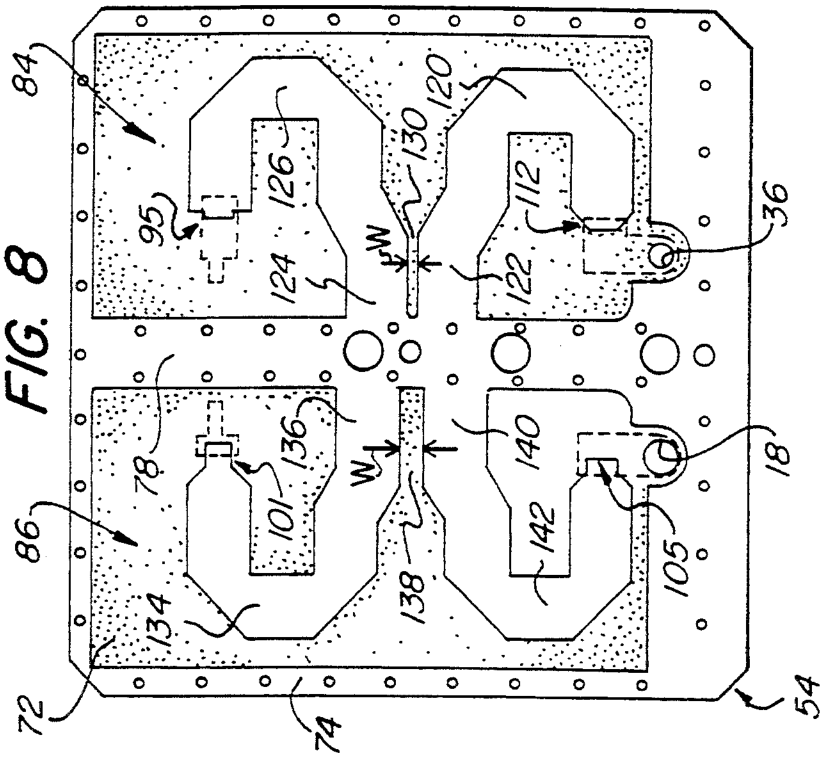
FIG. 8 is a plan view of the top side of the carrier board of FIG. 6.
Figure 8A:
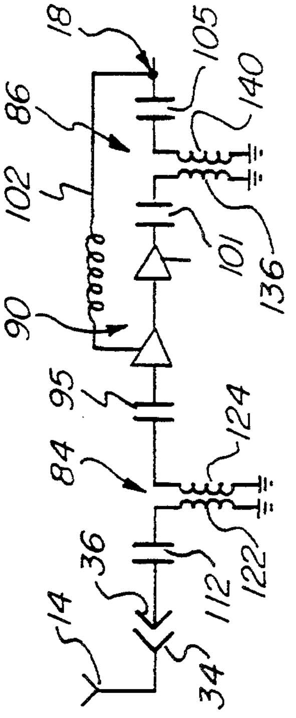
FIG. 8A is a schematic diagram of an equivalent circuit for the amplifier and filters on the carrier board.

FIG. 8A illustrates an equivalent circuit diagram for the input filter 84, the amplifier 90, and the output filter 86. The input filter 84 acts as a preselector for rejection of spurious signals. Its specification requires a low insertion loss of less than about 0.4 db, a rejection by 20 db of signals away from the centerband by about ±140 MHz, an SWR of about 1.2 to 1 or better, and a passband in the range of generally less than ±15 MHz around the center frequency.

The output filter 86 preferably has a more narrow bandwidth in the range of less than about ±10 MHz with a 30 db rejection and generally less than about 1 db insertion loss.

Figure 6:
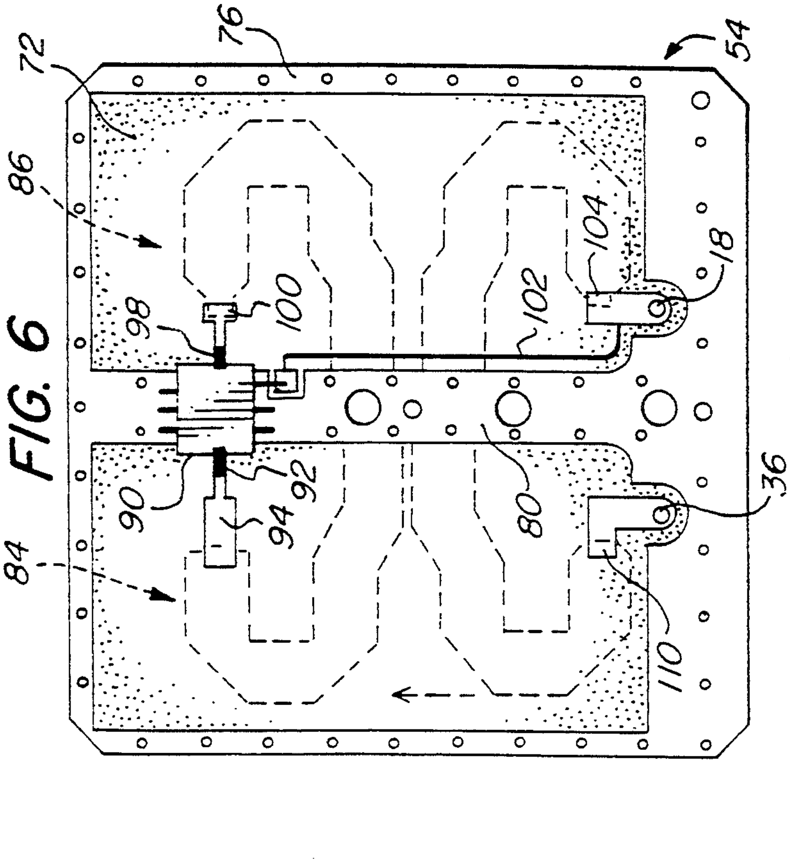
FIG. 6 is a plan view of the underside of a carrier board with a filter and amplifier used in the receiver section of the microstrip circuit of FIG. 3.
Figure 7:
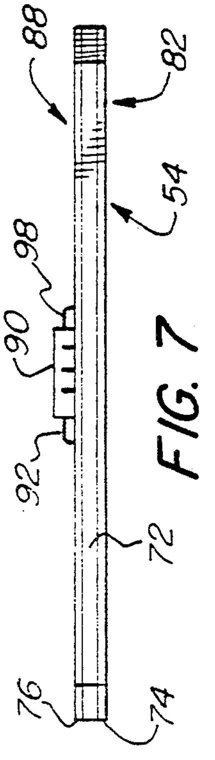
FIG. 7 is an on-edge side view of the carrier board of FIG. 6.

These performance characteristics are achieved and maintained throughout ambient changes with the filter geometries as illustrated in FIG. 8 and the filters positions relative to the amplifier 90 and its leads as shown in FIG. 6.

The input filter is formed of input capacitor 112, followed by a quarter wavelength section 120 and an inductive section 122, one end of which is connected to ground. A similar second inductive section 124 is coupled by a quarter wavelength section 126 to capacitor 95 and then to input lead 92 of amplifier 90. The coupling between the inductive sections 124, 126 is determined by the width W of gap 130 which is selected commensurate with the above filter performance characteristics. For a center frequency of 1.575 GHz, the width of gap 180 is about 0.030" or 0.76 mm.

The output filter 86 is of a similar construction as input filter 84, commencing with capacitor 101, a quarter wavelength section 134 and an inductive section 136. A gap 138 separates section 136 from another inductive section 140, which in turn is connected by way of a quarter wave section 142 to capacitor 105. The coupling between inductive sections 136, 140 is determined by the width W of gap 138. For filter performance characteristics as described above and a center frequency of 1.575 GHz, the width of gap 138 is about 0.100" or 2.54 mm.

Figure 5:
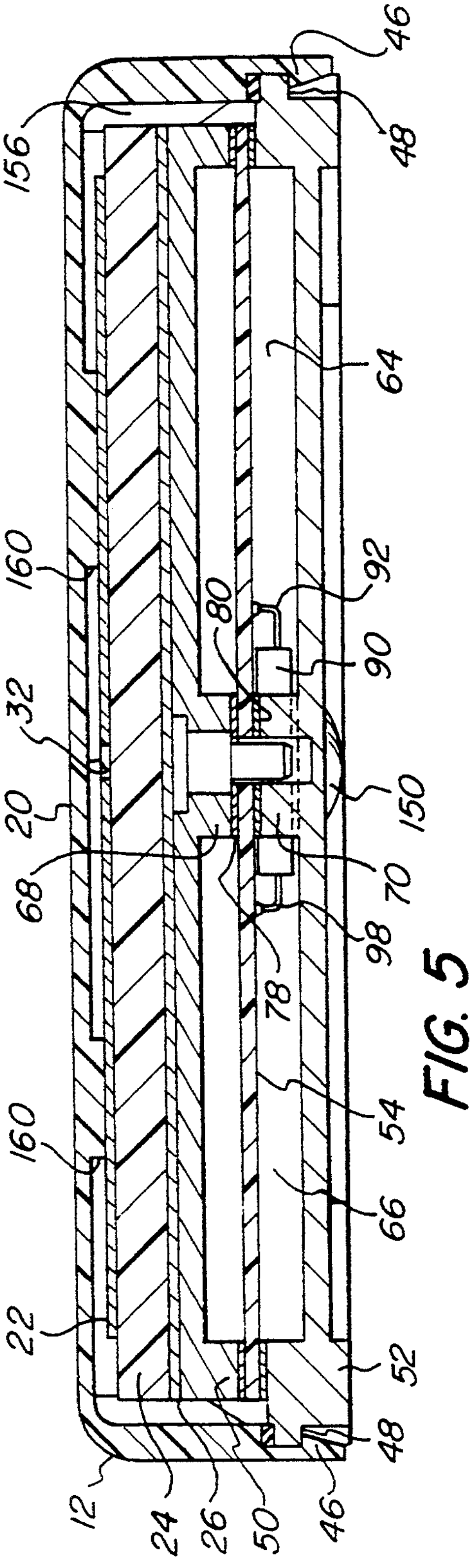
FIG. 5 is a cross-sectional view of the microstrip circuit shown in FIG. 1 and taken along the line 5—5 therein.

The amplifier 90 is mounted to the carrier board 54 in such a manner that it fits, as shown in FIGS. 3, 3A, and 5 over center conductive land 80. The isolation wall 70 in lower plate 52 is partially cut away to form a gap 148 (see FIG. 3) into which amplifier 90 fits when the carrier board 54 is sandwiched between plates 50, 52 by screws or rivets 150. With an amplifier 90 and filter geometries as illustrated and described, a very low noise figure of about 1.3 db can be achieved with a low SWR of the order of 1.3 to 1 or better.

The filter amplifier assembly 16 can be used within other microwave circuits and with different antenna structures.

Figure 4:
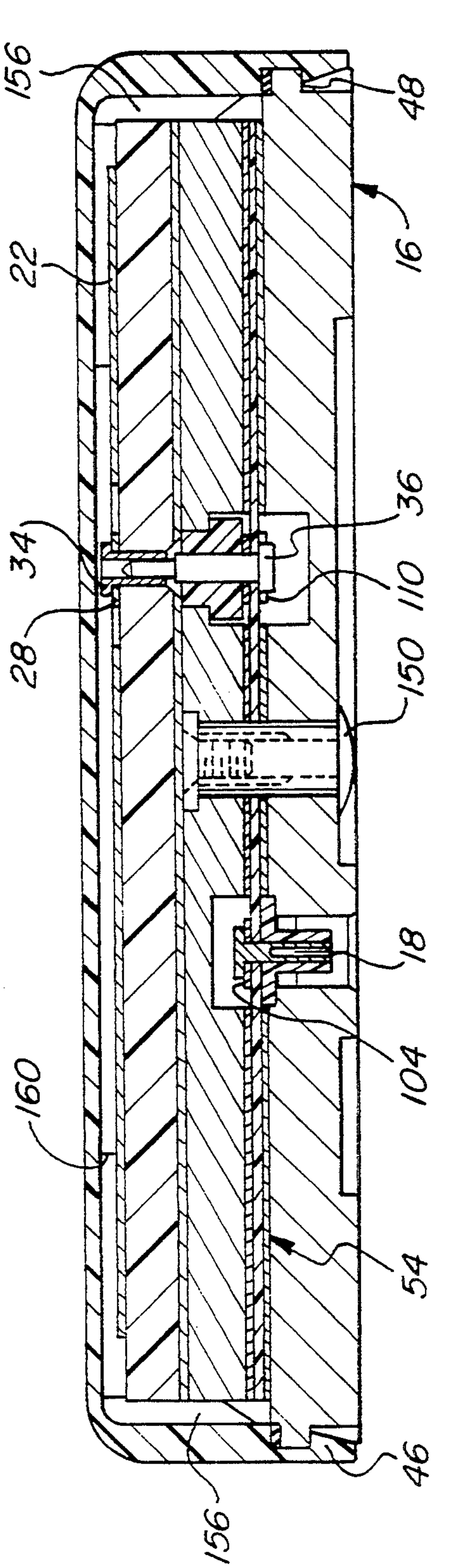
FIG. 4 is a cross-sectional view of the microstrip circuit shown in FIG. 1 and taken along the line 4—4 therein.

The assembly of the microstrip circuit is made convenient and precise as can be particularly appreciated with reference to FIGS. 3, 4, and 5. The electrical connection between the microstrip patch antenna 22 and the input filter 84 is obtained with push-on interfitting connectors 34, 36. Connector 34 is soldered to the feed line 28 and connector 36 is soldered to conductor land 110. Thereafter, interconnection need only involve pushing the respective assemblies 14 and 16 together so that the male pin of connector 36 fits into the female basket of connector 34.

The radome 12 is made of a plastic material that is made suitable to withstand sunlight and other weathering conditions. The plastic radome, being close to the antenna patch 22, does tend to affect its performance particularly if the patch would shift relative to the radome 12. The radome 12 is, therefore, provided with deformable centering ribs 156. The ribs 156 enable the microstrip antenna 14 and the upper plate 50 of the filter and amplifier assembly 16 to be pushed in with friction while centering the antenna assembly relative to the radome.

Further fixation of the radome 12 relative to the antenna patch 22 is obtained by providing a pressure loading of the patch 22 against a slightly resilient radome top portion 20. The top portion 22 is provided with a flat inner raised segment 160 that serves to abut against antenna patch 22. The raised segment is further shaped so that radome top portion 20 does not contact the patch 22 in the immediate vicinity of its slot 32. This feature of radome 12 is particularly illustrated with the view of FIGS. 9 and 10. A radome in accordance with the invention can be used with other microwave structures and antennas.

Figure 9:
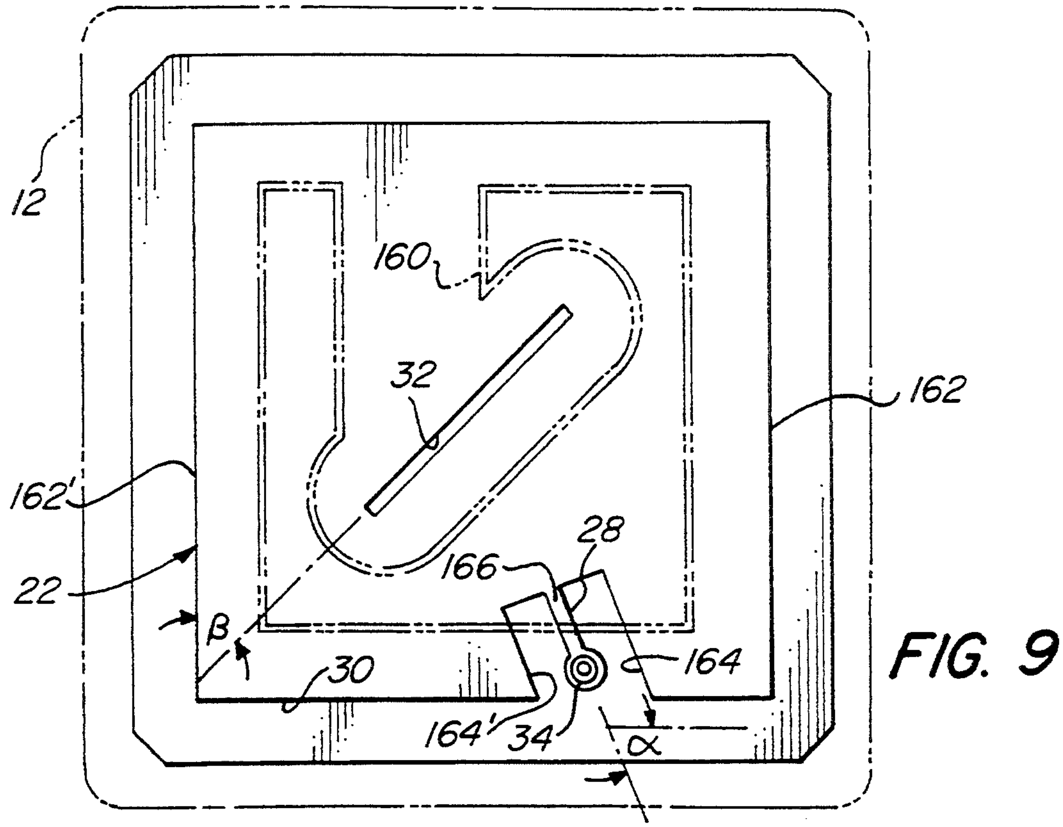
FIG. 9 is a plan view of the top side of the microstrip patch antenna used in the microstrip circuit of FIG. 1.
Figure 10:
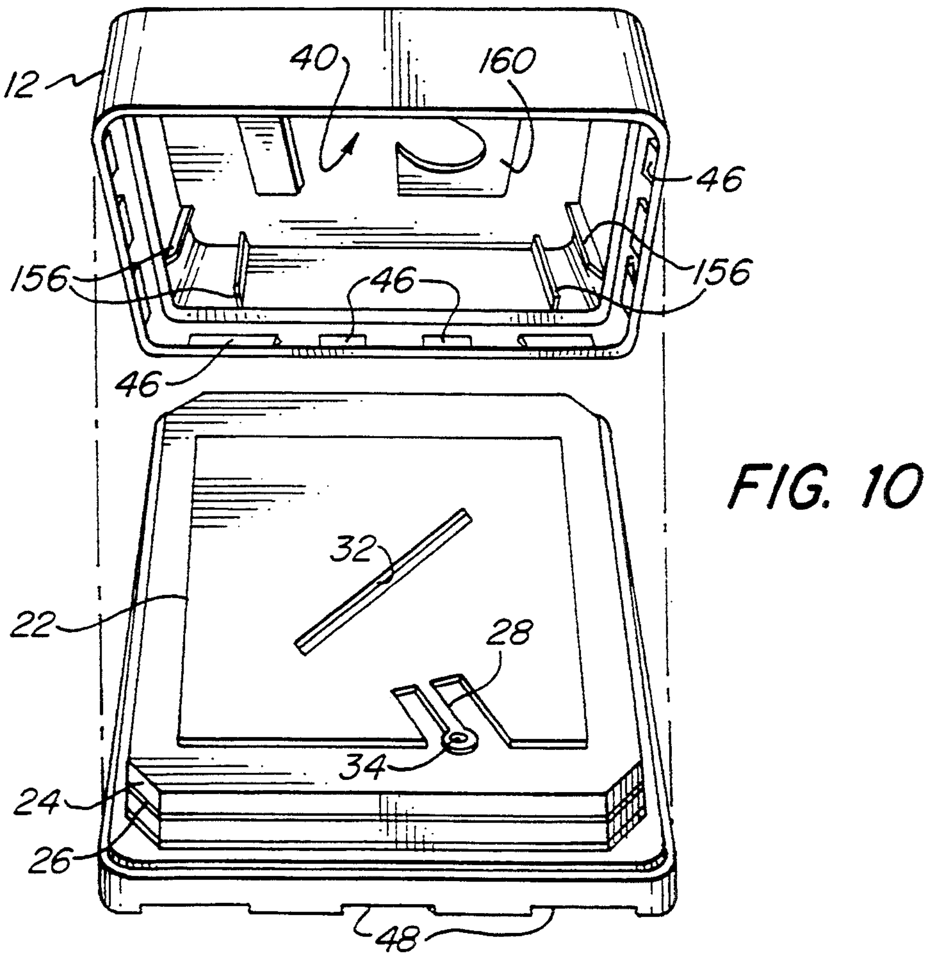
FIG. 10 is a front perspective view of the microstrip patch antenna and radome used in the microstrip circuit of FIG. 1.

The circular polarized microstrip patch 22 as illustrated in FIG. 9 is almost square shaped with the dimension of edge 30 having the feed line 28 slightly smaller than edge 162. The feed line 28 is surrounded by undercuts 164–164 on both sides. Feed line 28 forms an acute angle alpha with edge 30 and extends into patch 22 to a point 166 where a good impedance match is obtained. The angle alpha can vary substantially while maintaining for the patch antenna a low SWR, a low loss and a good radiation pattern. The angle alpha may vary, being preferably in the range from about 60° to about 85° and in the embodiment is about 68°.

The slot 32 is in the middle of patch 22 and is generally aligned along one of its diagonals. The size of the undercuts 164 and the angle alpha of the feed line 28 achieves both a desired impedance match and the required phase separation, needed for circular polarization, over a large area of the patch 22. These features allow the antenna to receiver feedpoint as represented by the connector 34 to be within an equilateral triangular area whose apex is the optimum feedpoint 166. This achieves maximum flexibility for the location of the antenna/receiver interface location while maintaining a best impedance match and minimum loss.

An antenna patch 22, which provided the desired performance at a frequency of 1.575 GHz, had the following particular dimensions, side 30 was 2.1" (53.34 mm) and side 162 was 2.066" (52.48 mm), slot 32 was 1.025" (26 mm) long, and 0.055" (1.4 mm) wide and aligned along an angle, beta, with respect to side 162' of 45.47°. The feedline 28 was 0.050" (1.27) mm. wide and its length selected to accommodate the placement of the center of connector 34 at about 0.096" (2.43 mm) from edge 30 and about 0.671" (17.04 mm) from edge 162. The angle alpha for the feedline 28 was about 68° and the thickness of the substrate about 0.140" (3.56 mm).

Figure 11:
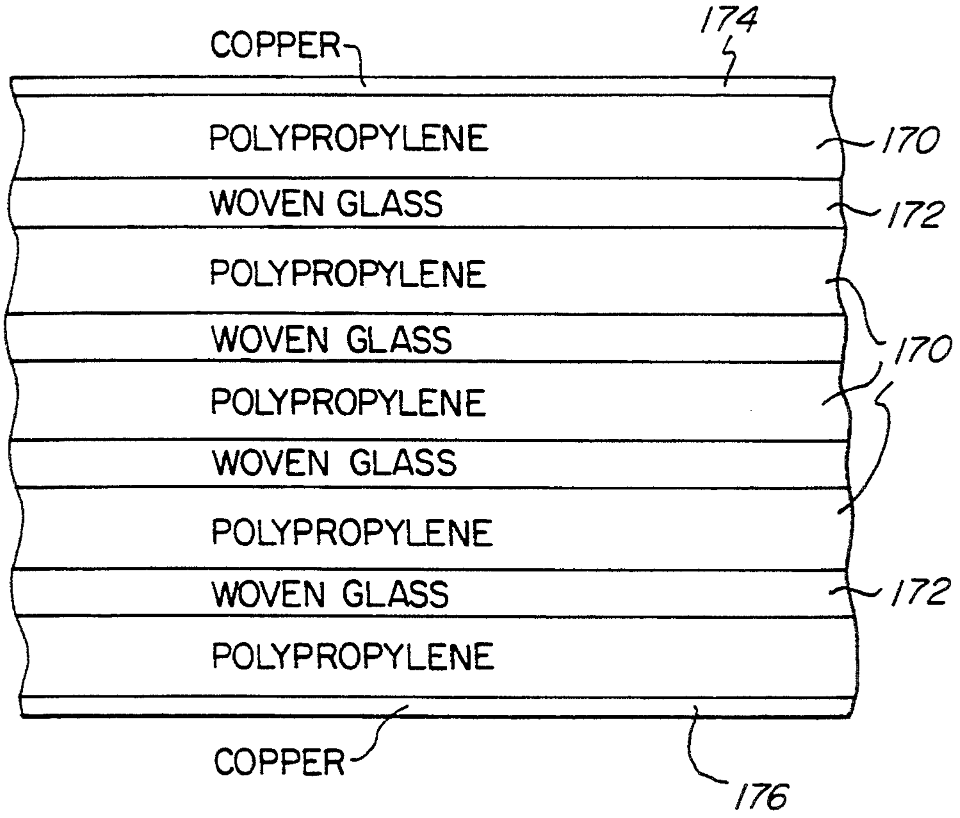
FIG. 11 is a greatly enlarged partial sectional view of a substrate material in accordance with the invention and used in the microstrip circuit of FIG. 1.

The performance of the microstrip patch antenna 14 is dependent upon the microwave characteristics of the substrate 24. In FIG. 11, a greatly enlarged view of a substrate 24 is shown formed of alternating layers of polypropylene 170 and woven glass 172. The polypropylene layers 170 are substantially thicker than woven glass layers 172, generally by a factor in the range from about 1.5 to about 5. In one substrate 24, the polypropylene layers 170 were about 0.020" thick and the woven glass layers 172 about 0.008" thick. The layers 170, 172 can be bonded together with heat and pressure.

Copper layers 174, 176 may bé affixed to polypropylene layers 170 with thin layers of adhesive or with thin layers of polyethylene or with heat and pressure when the copper layers have specially prepared surfaces, such as with copper oxide to form adequate bonds.

The electromagnetic characteristics of the layered substrate 24 is excellent with a constant dielectric constant over temperatures and microwave frequencies of interest and is a low-loss material. The substrate 24 can be used, with or without copper claddings, in a broad range of microwave products such as connectors, coaxial cables, waveguide structure, and other antennas, stripline and microstrip circuits.

Having thus described a microstrip antenna and receiver and their components in accordance with the invention, its advantages can be appreciated. Variations from the illustrated embodiment can be made without departing from the scope of the invention as determined by the following claims. For example, a pressurization of the antenna patch can be achieved by use of a compressible resilient layer, either between the antenna 14 and the receiver 16 or between the receiver 16 and a snap fitting lower cover plate that fits within housing 12 below the tongs 46.

What is claimed is:

1. A low noise figure microwave filter and amplifier assembly, comprising:

a stripline circuit formed of upper and lower metal plates and a carrier board spaced from and between the plates; said carrier board being formed of a thin insulative substrate material carrying a metal cladding shaped to form an input filter having an input port and an output filter having an output port, said input and output filters having in the aggregate a desired passband at a selected microwave frequency; a grounded isolation conductor located on the carrier board between the input and output filters;

an amplifier mounted on the isolation conductor on the carrier board between the input and output filters and having an input line coupled to an output port of the input filter and having an output line coupled to an input port of the output filter, the lengths and locations of the input and output lines being selected to reduce connection losses and preserve a low noise figure for the stripline circuit; and first connector means for coupling a microwave input signal to the input port of the input filter and second connector means for coupling an amplified microwave signal from the output port of the output filter through one of said plates.

2. The low noise figure microwave filter and amplifier as claimed in claim 1 wherein the stripline circuit is folded with the input filter on one side and the output filter alongside thereof and with the isolation conductor extending therebetween.

3. The low noise figure microwave filter and amplifier assembly as claimed in claim 2 and further including a thin conductor extending from the second connector means to said amplifier to deliver DC power thereto and being sized to present a high inductance at microwave frequencies.

4. The low noise figure microwave filter and amplifier as claimed in claim 3 wherein the substrate is further provided with peripheral conductive cladding on the substrate, and wherein the isolation conductor is in the form of a second conductive cladding and is located substantially in the middle of the substrate and is in contact with the peripheral cladding.

5. The low noise figure microwave filter and amplifier as claimed in claim 4 wherein said peripheral conductive cladding and said second conductive cladding are located on opposite sides of the substrate and are aligned opposite each other.

6. The low noise figure microwave filter and amplifier as claimed in claim 5 wherein the amplifier has radio frequency (rf) input and rf output leads and wherein the amplifier is mounted over said second conductive cladding on one substrate side which is opposite to a second substrate side on which the input and output filters are located;

capacitor plates, each being located on said one substrate side in overlapping relationship with a portion of one of said filters to form a capacitor therewith and being in close proximity to the amplifier and respectively connected to the rf input and rf output leads.

7. A low noise figure microwave filter and amplifier assembly as claimed in claim 1 wherein the amplifier has radio frequency (rf) input and rf output leads, capacitive plates on one side of the substrate and located in close proximity to the amplifier and being in overlapping relationship with portions of said filters to form capacitors therewith and being respectively connected to the rf input and rf output leads.

8. A filter and amplifier assembly, comprising:

a metal housing formed with separable and matingly fitting upper and lower metal plates, each of said plates having similarly shaped recesses which, when the upper and lower metal plates are joined, form input and output microwave lines separated by an isolation wall therebetween;

a stripline filter formed of a relatively thin insulative substrate commensurately shaped as said upper and lower plates, said substrate having metalized claddings shaped to form input and output stripline filters, said substrate fitting in suspended fashion between the upper and lower plates respectively within said input and output microwave lines;

said substrate for said input and output stripline filters having opposite sides and peripheral conductive claddings on said opposite sides of the substrate in contact with the upper and lower plates and having isolation conductive claddings connected to the peripheral conductive claddings and located on opposite sides of the substrate and located in-between the input and output filters and in-between opposite isolation walls of the upper and lower metal plates for contact therewith;

a microwave amplifier operatively coupled to and located between the input and output filters to amplify microwave signals from the input filter; and input means extending through one of said metal plates for coupling microwave signals from outside the metal housing to the input filter and output means extending through the other of said metal plates for coupling said amplified microwave signals from the output filter to outside the housing.

9. The microwave filter and amplifier assembly as claimed in claim 8 wherein one of said isolation walls is interrupted for a distance to form a space that is sufficient to receive the amplifier.

10. The microwave filter and amplifier assembly as claimed in claim 9 wherein the substrate further has a conductor line sized and located to form an inductor at microwave frequencies, said conductor line being DC coupled to the output means and to the amplifier to provide DC power thereto.

11. A microwave receiver assembly, comprising:

a microwave transparent radome housing shaped to form a recess bounded by a top portion and a peripheral wall extending downwardly from the top portion;

a multilayered receiver structure shaped to snugly fit inside the recess of the radome housing; said structure including:

a microstrip antenna positioned adjacent the top portion of the housing and formed of a substrate having an antenna patch on one side adjacent the top portion and a ground plane on an opposite side, a first connector coupled to the antenna patch and extending through the substrate and the ground plane;

a microwave filter and amplifier assembly formed of upper and lower plates and a carrier board positioned between and spaced from the plates, said carrier board having an input filter having an output and an output filter having an input and a radio frequency (rf) amplifier mounted thereon and with the rf amplifier being coupled between the output of the input filter and input of the output filter;

an input connector applied to an input of the input filter and matingly engaged with said first connector; and an output connector coupled to an output of the output filter.

12. The microwave receiver assembly as claimed in claim 11 wherein the top portion of the radome housing is resilient; and wherein the multilayered receiver structure has means for snap-fitting the lower plate to the radome peripheral wall with pressure loading of the antenna patch against the top portion of the radome housing.

13. The microwave receiver as claimed in claim 12 wherein the radome housing has means, attached to the peripheral wall, for centering the microstrip antenna within the recess.

14. The microwave receiver as claimed in claim 13 wherein the centering means comprises a plurality of deformable ribs projecting from the peripheral wall into the recess of the radome housing so as to produce an interference fit between the ribs and the microstrip antenna when it is pressed into the radome housing.

15. The microwave receiver as claimed in claim 14 wherein the top portion of the radome housing has an embossment projecting into the recess and for abutting contact with the antenna patch.

16. A microwave receiver assembly comprising:

a substantially square microwave transparent radome having a top portion and a peripheral wall depending therefrom to form a recess;

a layered microstrip circular polarized patch antenna having a substantially square shaped substrate having on one side thereof a substantially square shaped radiating patch, and having a groundplane on an opposite side of the substrate, with the groundplane being larger in area than said radiating patch;

said patch antenna being located inside the recess with the radiating patch adjacent the top portion of the radome;

said top portion of the radome having an embossment projecting inwardly into the recess and being selectively shaped to contact the adjacent radiating patch in a desired area thereof;

a substantially square shaped receiver stripline structure formed of a pair of shielding upper and lower plates and a carrier board suspended between the plates; said carrier board having flat filtering means mounted thereon as part of a stripline circuit for producing desired passband characteristics; and a radio frequency (rf) amplifier integrally located with respect to said filtering means so as to achieve a low noise figure and preserve a low standing wave ratio for the stripline structure; said stripline structure fitting in flush layered relationship with respect to the layered patch antenna inside the recess of the radome;

input connector means for coupling rf signals from the radiating patch through the ground plane and the upper plate to an input of the filtering means; and output connector means for coupling amplified and filtered rf signals at an output of the filtering means through the lower plate.

* * * * *